United States Patent
Huang

(10) Patent No.: US 8,674,811 B2
(45) Date of Patent: Mar. 18, 2014

(54) CONTROL METHOD FOR RFID TAG AND RFID SYSTEM THEREOF

(75) Inventor: Chih-Hua Huang, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 558 days.

(21) Appl. No.: 12/553,188

(22) Filed: Sep. 3, 2009

(65) Prior Publication Data

US 2010/0066510 A1  Mar. 18, 2010

(30) Foreign Application Priority Data

Sep. 12, 2008 (TW) ................................ 97135026 A

(51) Int. Cl.
*H04Q 5/22* (2006.01)

(52) U.S. Cl.
USPC ... 340/10.42; 340/10.1; 340/10.3; 340/10.31; 340/540

(58) Field of Classification Search
USPC ......... 340/10.1, 10.42, 10.4, 10.3, 10.31, 540
See application file for complete search history.

(56) References Cited

U.S. PATENT DOCUMENTS

| | | | | |
|---|---|---|---|---|
| 6,172,596 B1* | 1/2001 | Cesar et al. | ............... | 340/10.41 |
| 7,119,664 B2* | 10/2006 | Roesner | ............... | 340/10.33 |
| 7,245,213 B1* | 7/2007 | Esterberg et al. | ......... | 340/539.12 |
| 7,298,268 B2* | 11/2007 | Zimmerman et al. | ..... | 340/572.1 |
| 7,973,644 B2* | 7/2011 | Tuttle | ............. | 340/10.1 |
| 8,228,175 B1* | 7/2012 | Diorio et al. | ............... | 340/10.51 |
| 8,242,891 B2* | 8/2012 | Sugahara | ............... | 340/10.4 |
| 2004/0016808 A1* | 1/2004 | Kang | ............... | 235/441 |
| 2005/0001718 A1* | 1/2005 | Asauchi | .............. | 340/539.3 |
| 2006/0145816 A1* | 7/2006 | Koele | ............... | 340/10.2 |
| 2006/0255131 A1* | 11/2006 | Stewart | ............... | 235/383 |
| 2007/0017983 A1* | 1/2007 | Frank et al. | ............... | 235/385 |
| 2007/0069866 A1* | 3/2007 | Schuessler et al. | .......... | 340/10.4 |
| 2007/0126555 A1* | 6/2007 | Bandy | ............... | 340/10.2 |
| 2007/0236331 A1* | 10/2007 | Thompson et al. | .......... | 340/10.1 |
| 2008/0018431 A1* | 1/2008 | Turner et al. | ............... | 340/10.2 |
| 2008/0129447 A1* | 6/2008 | Choi et al. | ............... | 340/5.61 |
| 2008/0204199 A1* | 8/2008 | Howarth et al. | ............. | 340/10.1 |
| 2008/0211637 A1* | 9/2008 | Smith | ............... | 340/10.42 |
| 2008/0309490 A1* | 12/2008 | Honkanen et al. | .......... | 340/572.1 |
| 2009/0015382 A1* | 1/2009 | Greefkes | ............... | 340/10.2 |
| 2009/0267738 A1* | 10/2009 | Liu et al. | ............... | 340/10.1 |
| 2010/0013604 A1* | 1/2010 | Turner et al. | ............... | 340/10.41 |
| 2010/0019883 A1* | 1/2010 | Eom et al. | ............... | 340/10.1 |
| 2010/0033305 A1* | 2/2010 | Korgaonkar et al. | ........ | 340/10.1 |
| 2010/0066510 A1* | 3/2010 | Huang | ............... | 340/10.42 |
| 2011/0279235 A1* | 11/2011 | Lee et al. | ............... | 340/10.1 |

FOREIGN PATENT DOCUMENTS

CN  101089872 A  12/2007

OTHER PUBLICATIONS

Chinese Patent Office, Office Action 0810297CN dated Jun. 17, 2011, 6 pages.

* cited by examiner

*Primary Examiner* — Benjamin C Lee
*Assistant Examiner* — Quang D Pham
(74) *Attorney, Agent, or Firm* — Edell, Shapiro & Finnan, LLC

(57) ABSTRACT

A control method for a radio frequency identification (RFID) tag is provided. The control method includes steps of prompting a plurality of RFID tags to enter a ready state; enabling a first RFID tag from the RFID tags to enter an accessible stage, and providing a first identification code to the first RFID tag; and commanding the first RFID tag to enter a standby state from the accessible stage.

11 Claims, 4 Drawing Sheets

CONTROL METHOD FOR RFID TAG AND RFID SYSTEM THEREOF

CROSS REFERENCE TO RELATED PATENT APPLICATION

This patent application is based on Taiwan, R.O.C. patent application No. 97135026 filed on Sep. 12, 2008.

FIELD OF THE INVENTION

The present invention relates to a control method for a radio frequency identification (RFID) tag and an RFID system thereof, and more particularly, to a control method for a class 1 generation 2 (C1G2) compliant RFID tag and an RFID system thereof.

BACKGROUND OF THE INVENTION

FIG. 1 is a schematic diagram showing a state flow of a C1G2 compliant RFID tag in the prior art. The RFID tag is controlled by an RFID reader to enter different states. A plurality of states, namely a ready state, an arbitrate state, a reply state, an acknowledged state, an open state, a secured state and a killed state, are illustrated in FIG. 1. In the ready state, supposing the RFID tag is a passive RFID tag, it means that the RFID tag receives signals transmitted by the RFID reader and thus generates power. The RFID tag then receives a command of the RFID reader and enters the arbitrate state. A time-consuming and complex singulation procedure is necessarily performed to allow one selected RFID tag at a time to enter other states after the reply state, while other RFID tags await in the arbitrate state. In the acknowledged state, the RFID reader sends an identification code, such as "handle" in this example, for identification when the RFID reader accesses data.

Generally speaking, the ready, arbitrate, reply, and acknowledged phases are preparatory steps for accessing the RFID tag. After the open state and the secured state, the RFID tag enters an accessible stage including the open and secured states. In the open state, a part of a data stored in a first RFID tag is accessible. In the secured state, the RFID reader need be authorized by the first RFID tag before accessing more data than in an open state; that is, secured data is then accessible provided the RFID reader is authorized. Once having entered the killed state, the RFID tag remains in the killed state, in which the RFID tag is inaccessible. Referring to FIG. 1, the RFID tag directly enters the killed state from the open state by skipping the secured state. Detailed operations of accessing other C1G2 compliant RFID tags are known to a person having ordinary skill in the art, and thus shall not be discussed for brevity.

However, within a same round of accessing a group of RFID tags, the accessed RFID tags cannot be accessed again until the entire state flow is repeated. When data of another RFID tag is needed for accessing one of the RFID tags, the entire state flow is executed to access the RFID tag, and the accessed data is temporarily stored in other memory apparatuses. Again, the entire state flow is repeated to access a data of another apparatus when needed. Such methodology is rather inconvenient.

SUMMARY OF THE INVENTION

Therefore, one objective of the present invention is to provide a control method for an RFID tag and a system thereof, so as to access the RFID tag without repeating the entire state flow as described above.

A control method for an RFID tag is provided according to an embodiment of the present invention. The control method comprises steps of prompting a plurality of RFID tags to enter a ready state, enabling a first RFID tag of the plurality of RFID tags to enter an accessible stage and providing a first identification code to the first RFID tag, and commanding the first RFID tag to enter a standby state from the accessible stage.

An RFID system using the foregoing method is provided according to another embodiment of the present invention. The RFID system comprises a plurality of RFID tags and an RFID reader. The RFID reader prompts the plurality of RFID tags to enter a ready state, enables a first RFID tag of the plurality of RFID tags to enter an accessible stage, provides a first identification code to the first RFID tag, and commands the first RFID tag to enter a standby state from the accessible stage.

With the above embodiments, the RFID tag is allowed to stay in a standby state, from which the RFID tag can be called out whenever needed, so that data access of the RFID tag is made more flexible.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
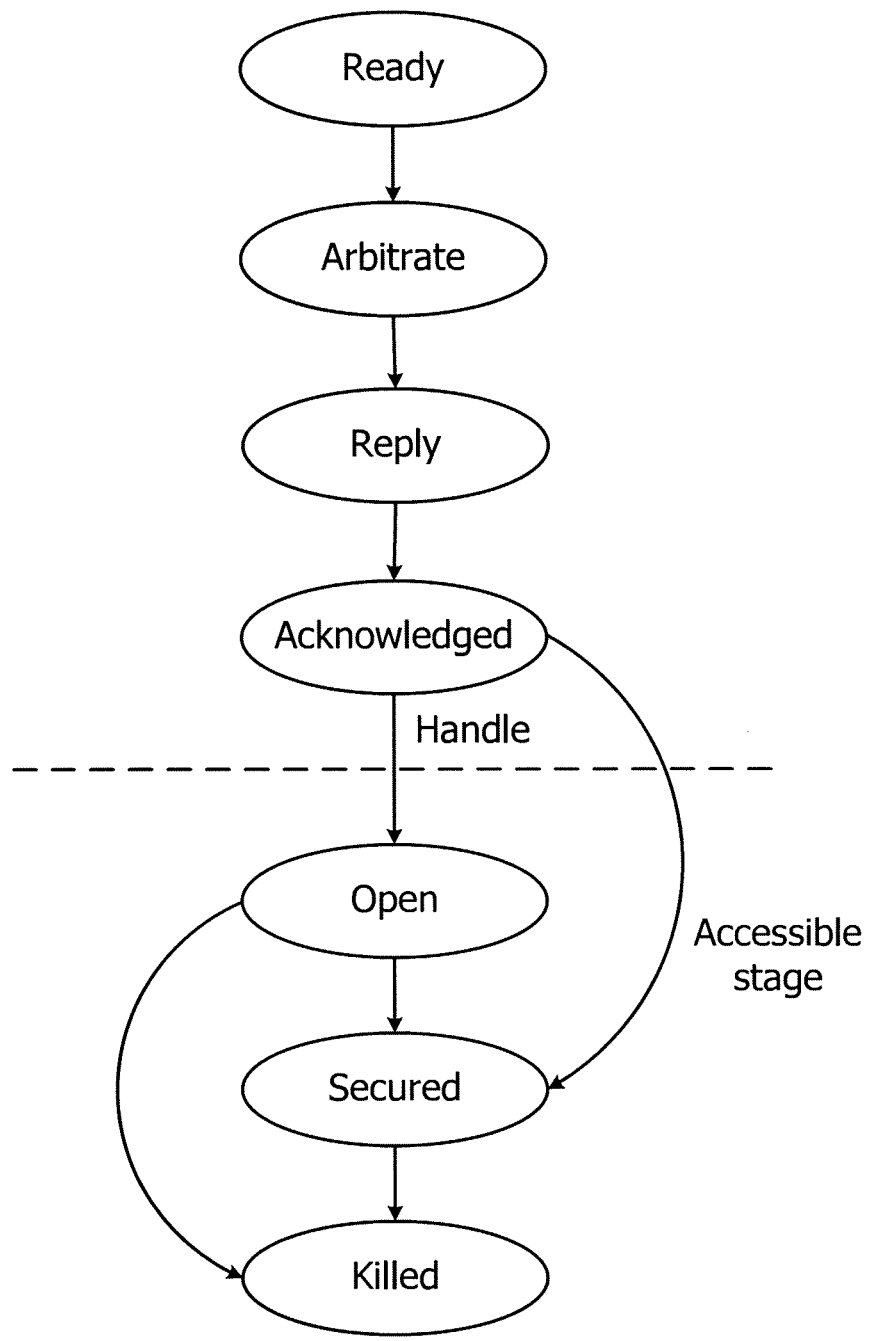
FIG. 1 is a schematic diagram of accessing a C1G2 compliant RFID tag of the prior art.
Figure 2:
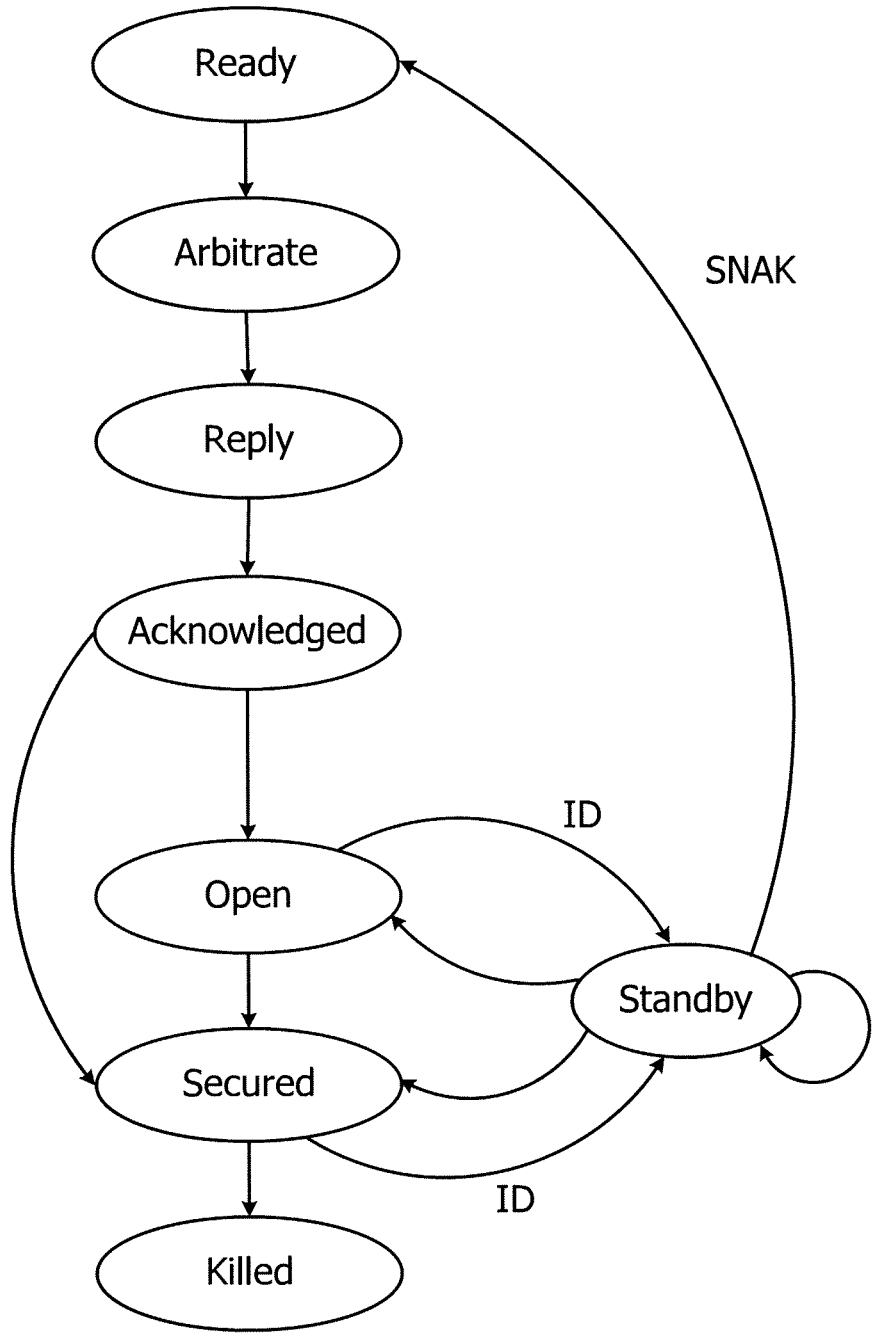
FIG. 2 is a schematic diagram showing a C1G2 compliant RFID tag entering a standby state in accordance with an embodiment of the present invention.

FIG. 2 is a schematic diagram showing a C1G2 compliant RFID tag entering a standby state in accordance with one embodiment of the present invention. Also with reference to FIG. 1 for a better understanding of the present invention, only partial steps are illustrated for brevity. Referring to FIG. 2, the RFID tag enters a standby state after undergoing an accessible stage, which includes an open state and a secured state. Moreover, more than one RFID tag at a time is allowed to enter the standby state. In the standby state, an identification code ID different from an identification code handle is provided to the RFID tag. The identification code handle differs from the identification code ID in that, the identification code handle is provided in an acknowledged state to identify which RFID tag is to be accessed, whereas the identification code ID is provided to identify all the RFID tags in the standby state. For example, when five RFID tags enter the standby state, identification codes ID 1 to ID 5 are respectively designated to the five RFID tags, so as to precisely identify the RFID tags called out from the standby state. It is to be noted that the RFID tag need not be necessarily designated with respective identification codes ID. The identification code ID is to ensure that the RFID tag in the standby state is accessed more smoothly. It is feasible to apply the identification code handle, instead of the identification code ID, for identifying all the RFID tags in the standby state. However, proper modifications may be made such as applying other methods to identify RFID tags, as also encompassed within scope of the present invention. For example, the identification code ID and the identification code handle are used simultaneously to ensure correctness of identification.

The RFID tag having entered the standby state may remain in the standby state. When called out from the standby state, the RFID tag may enter to the open or secured state without returning to the ready state, the arbitrate state, the acknowledged state, and the reply state illustrated in FIG. 1, i.e., the RFID tag directly enters to the accessible stage and can then be directly accessed. Furthermore, when the RFID tag exits from the standby state, the RFID tag, which need not return to the open or secured state, receives a command, e.g., in the embodiment, a SNAK command for resetting the RFID tag to the ready state, and accordingly re-enters the ready state.

The disadvantage in the prior art that the entire state flow must be repeated to again access a data of the RFID tag is overcome via the foregoing method. Consider accessing two RFID tags, for example, to clearly illustrate an operation of the present invention. A first RFID tag, such as a passive RFID tag in the embodiment, is powered by an RFID reader to enter the ready state. After the arbitrate state, the reply state and the acknowledged state, the first RFID tag is provided with an identification code handle and enters an open or a secured state; that is, the RFID tag enters an accessible stage. When a second RFID tag is to be accessed, the first RFID tag first needs to enter a standby state. As mentioned above, when the first RFID tag enters the standby state, the RFID reader simultaneously provides another identification code ID different from the identification code handle to the first RFID tag. The identification code ID is for identifying the first RFID tag in the standby state. Alternatively, the RFID reader may provide only the identification handle but not the identification code ID to the first RFID tag to achieve a same objective.

When the first RFID tag enters the standby state, the RFID reader prompts the second RFID tag to enter a conventional state flow including a ready state, an arbitrate state, a reply state, an acknowledged state, an open state or a secured state. When data of the second RFID tag is accessed, the second RFID tag enters a standby state. The first RFID tag is then called out from the standby state to the open state or the secured state, from which data of the first RFID tag is accessed. Therefore, according to the foregoing method, one or a plurality of RFID tags are made to enter the standby state as needed to increase the applicability of data access of RFID tags.

Figure 3:
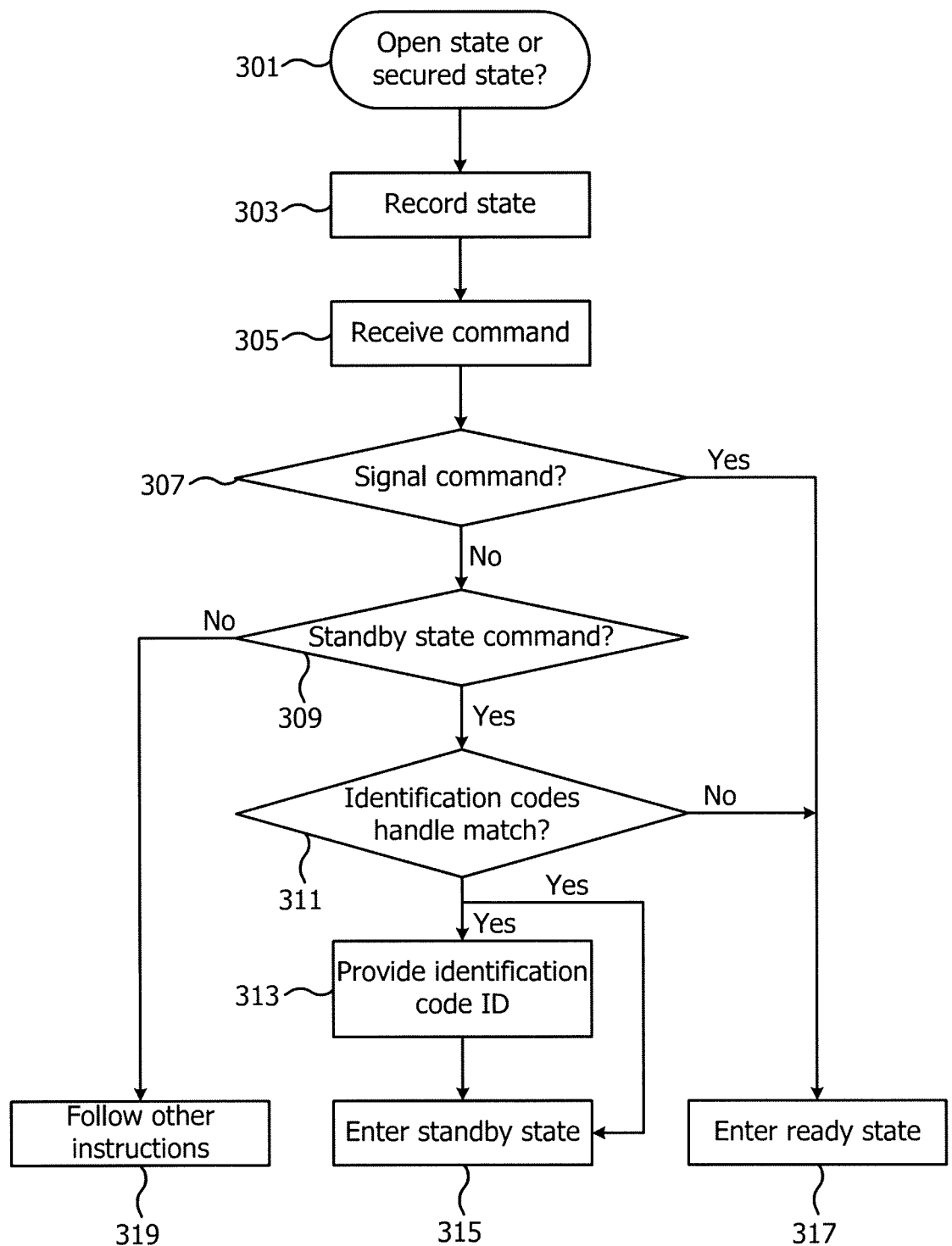
FIG. 3 is a flow chart showing partial steps of controlling an RFID tag in accordance with an embodiment of the present invention.
Figure 4:
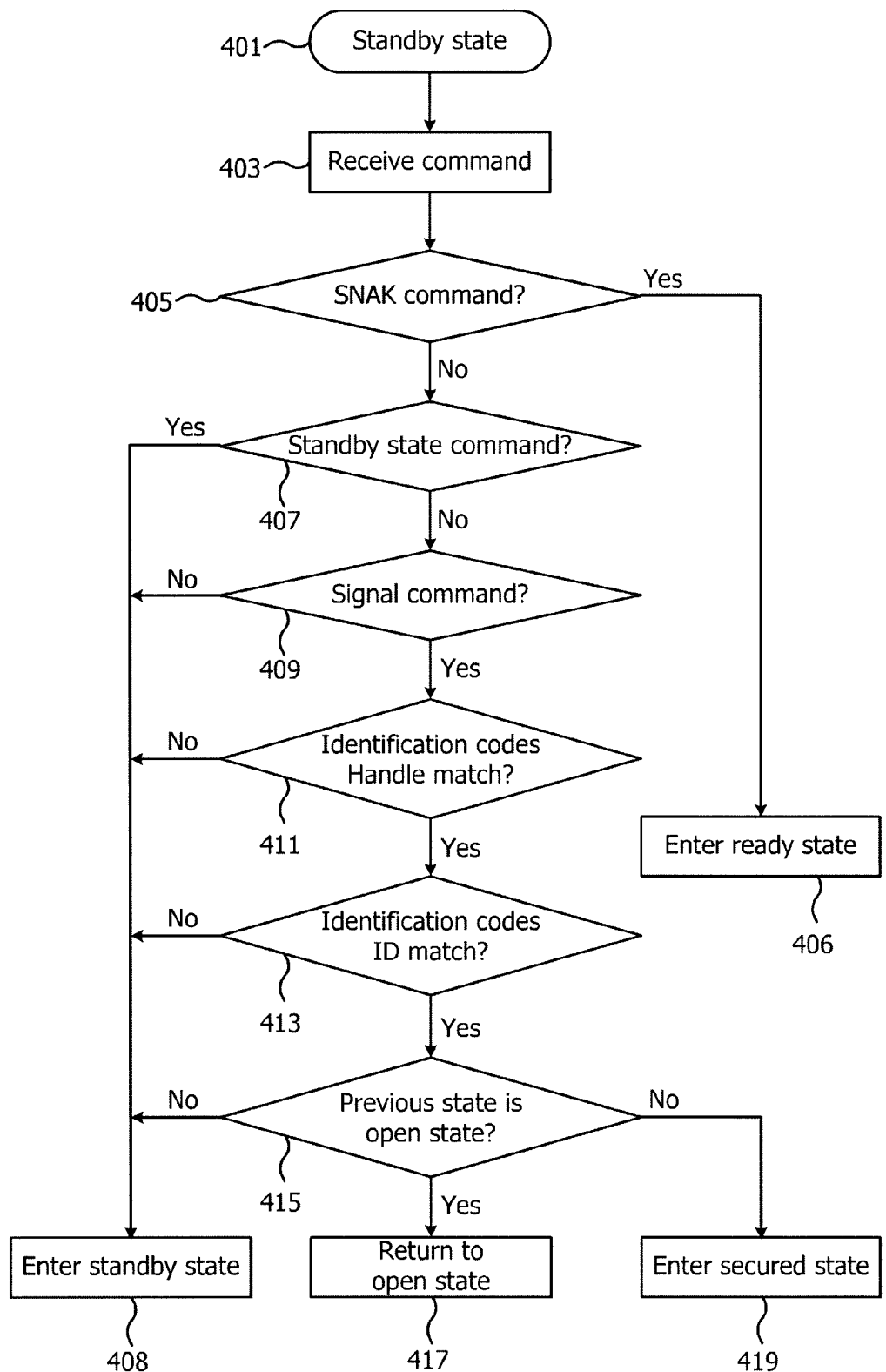
FIG. 4 is a flow chart showing partial of steps of controlling an RFID tag in accordance with an embodiment of the present invention.

FIG. 3 and FIG. 4 are flow charts of partial steps of controlling an RFID tag in accordance with an embodiment of the present invention. It is to be noted that the illustrated steps represent only an example and shall, accordingly, not be construed as limiting. Referring to FIG. 3, suppose the RFID tag is in an open state or a secured state to subsequently enter a standby state. In Step 301, the RFID tag is in the open state or the secured state. In Step 303, the state of the RFID tag is recorded. More specifically, whether the RFID tag is at the open state or the secured state is recorded, so that the RFID tag can return to the recorded state after exiting from the standby state. Step 305 of receiving a command is then executed. In Step 307, whether the command is a signal command is determined. The signal command is for calling out the RFID tag from the standby state to an accessible stage, which may be the open state or the secured state. Therefore, when the RFID tag receives the command while not being in the standby state, the command is considered as improper. The RFID tag is then forced back to the ready state. When the command is not a signal command, Step 309 of determining whether the command is the standby state command is executed. The method proceeds to Step 311 when the command is a standby state command, or else proceeds to Step 319 when the command is not a standby state command. In Step 319, the method follows other instructions to comply with the C1G2 specifications. In Step 311, whether an identification code handle contained in the command is the same as an identification code handle of the RFID tag is determined. That is, whether the command is received by a correct RFID tag is determined. When the result is negative, Step 317 of returning to the ready state is executed; otherwise, Step 313 of providing an identification code ID is executed. Whether to execute the optional Step 313 is determined according to a practical need to provide better design flexibility. In Step 315, the RFID tag enters the standby state.

Referring to FIG. 4, suppose the RFID tag is in a standby state to subsequently exit from the standby state. In Step 401, the RFID tag is in the standby state. In Step 403, the RFID tag receives a command. In Step 405, whether the command is a SNAK command for resetting the RFID tag to the ready state is determined. That is, whether to prompt the RFID tag to exit the standby state to return to the ready state is determined. When the received command is a SNAK command, Step 406 of returning to the ready state is executed; otherwise, Step 407 of determining whether the command is a standby state command is executed. When the received command is a standby state command, it means that the RFID tag shall not exit from the standby state, and hence Step 408 of remaining in the standby state is executed; otherwise, Step of 409 determining whether the command is a signal command is executed. The signal command is for calling the RFID tag out from the standby state to return to an accessible stage. When the received command is a signal command, Step 411 is executed; otherwise, Step 408 is executed. In Step 411, whether an identification code handle contained in the command is the same as an identification code handle of the RFID tag is determined. That is, whether the command is received by a correct RFID tag is determined. When the two identification codes match, Step 413 is executed; otherwise, Step 408 is repeated. In Step 413, whether an identification code ID contained in the command is the same as an identification code ID of the RFID tag is determined. When the two identification codes match, Step 415 is executed; otherwise, Step 408 is repeated. Similarly, the optional Step 415 is executed in conjunction with the optional Step 413. That is, when the identification code ID is provided when the RFID tag enters the standby state from the accessible stage, Step 413 has to be executed. In Step 415, whether the previously recorded state is the open state is determined. When the previously recorded state is the open state, Step 417 in which the RFID tag enters the open state is executed; otherwise, Step 419 in which the RFID tag enters the secured state is executed.

It is to be noted that, the embodiments take the RFID C1G2 specifications as an example. However, other specifications can be applied within the scope of the appended claims. From the foregoing description, the RFID tag is provided with an extra standby state in the accessible stage and enters the standby state when needed. Thus, in a single access cycle, when a specific RFID tag is accessed, even if other RFID tags are accessed, the specific RFID tag can be accessed again without executing the time-consuming and complex singulation procedure. Therefore, the inconvenience that an accessed RFID tag can only be again accessed in the next access cycle in the prior art is eliminated, so data access of the RFID tag is provided with better flexibility according to the present invention.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for controlling responses of a plurality of radio frequency identification (RFID) tags communicating with an RFID reader, comprising steps of:
   prompting the plurality of RFID tags to enter a ready state;
   executing singulation on the plurality of tags to select a first RFID tag;
   enabling the first RFID tag from the plurality of RFID tags to enter an accessible stage in which data stored in the RFID tag is accessible, wherein the accessible stage comprises an open state and a secured state;
   providing a first identification code by the RFID reader to the first RFID tag upon entry into the accessible stage, wherein the first identification code identifies the RFID tag being accessed;
   recording, by the first RFID tag, the open state or the secured state of the first RFID tag as a recorded state;
   accessing data stored in the first RFID tag when the first RFID tag is in a selected one of the open state and the secured state; wherein the data stored in the first RFID tag comprises a second identification code designated to the first RFID tag and is different from the first identification code;
   commanding the first RFID tag by the RFID reader to enter a standby state from the selected one of the open state and the secured state by providing a first command comprising the first identification code to the first RFID tag; wherein the standby state is linked to both the open state and the secured state;
   confirming, by the first RFID tag upon receiving the first command, whether the first identification code in the first command matches with the first identification code of the first RFID tag before entering the standby state;
   directly returning the first RFID tag from the standby state to the recorded state selected from the open state and the secured state without re-entering any other state upon receiving a second command by the first RFID tag, wherein the second command comprises the first identification code and the second identification code of the first RFID tag;
   confirming, by the first RFID tag, whether the first identification code and the second identification code contained in the second command match with first identification code and the second identification code stored in the first RFID tag;
   directly returning the first RFID tag from the standby station to the recorded state upon confirming that the second command first and second identification codes match the first and second stored identification codes; and
   accessing the data of the first RFID tag again within the recorded state without re-executing singulation for the first RFID tag.

2. The method as claimed in claim 1, wherein the recorded state is the open state, in which a part of a data stored in the first RFID tag is accessible.

3. The method as claimed in claim 1, wherein the recorded state is the secured state, in which the first RFID tag has an authentication scheme, and the first RFID tag allows secured data access thereto when the authentication scheme is satisfied.

4. The method as claimed in claim 1, further comprising:
   executing singulation on the plurality of RFID tags to select a second RFID tag upon the first RFID tag enters the standby state;
   enabling the second RFID tag from the plurality of RFID tags to enter the accessible stage; and
   accessing data stored in the second RFID tag while the first RFID tag is in the standby state;
   commanding the second RFID tag to enter the standby state from the selected one of the open state and the secured state.

5. The method as claimed in claim 1, further comprising: returning the first RFID tag or the second RFID tag from the standby state to the ready state upon receiving a resetting command sent by the RFID reader.

6. The method as claimed in claim 1, wherein the steps of controlling the responses of the first RFID tag from a plurality of RFID tags are RFID class 1 generation 2 (C1G2) compliant.

7. An RFID system for controlling responses of a plurality of radio frequency identification (RFID) tags communication with an RFID reader, comprising:
   the plurality of RFID tags; and
   the RFID reader configured to
     prompt a plurality of RFID tags to enter a ready state,
     execute singulation on the plurality of tags to select a first RFID tag,
     enable the first RFID tag of the plurality of RFID tags to enter an accessible stage in which data stored in the RFID tag is accessible, wherein the accessible stage comprises an open state and a secured state,
     provide a first identification code by the RFID reader to the first RFID tag upon entry into the accessible stage, wherein the first identification code identifies the RFID tag being accessed, wherein the first RFID tag records the open state or the secured state as a recorded state;
     access data stored in the first RFID tag when the first RFID tag is in a selected one of the open state and the secured state, wherein the data stored in the first RFID tag comprises a second identification code designated to the first RFID tag and is different from the first identification code;
     command the first RFID tag by the RFID reader to enter a standby state from the selected one of the open state and the secured state by providing a first command comprising the first identification code to the first RFID tag; wherein the standby state is linked to both the open state and the secured state, and wherein the first RFID tag confirms the first identification code in the first command matches with the first identification code of the first RFID tag before entering the standby state;
     return directly the first RFID tag from the standby state to the recorded state selected from the open state and the secured state without re-entering any other state by sending a second command comprising the first identification code and the second identification code to the first RFID tag; wherein the first RFID tag returns to the recorded state upon confirming the first identification code and the second identification code in the second command matches with the first identification code and the second identification code stored in the first RFID tag, and access the data of the first RFID tag again without re-executing singulation for the first RFID tag.

8. The RFID system as claimed in claim 7, wherein the recorded state is the open state, in which a part of data stored in the first RFID tag is accessible.

9. The RFID system as claimed in claim 7, wherein the recorded state is the secured state, in which the first RFID tag has an authentication scheme, and the RFID reader is allowed to access secured data from the first RFID tag after satisfying the authentication scheme.

10. The RFID system as claimed in claim 7, wherein the RFID reader is configured to:
   execute singulation on the plurality of tags to select a second RFID tag;
   enable the second RFID tag from the plurality of RFID tags to enter the accessible stage,
   access data stored in the second RFID tag while the first RFID tag is in the standby state, and
   command the second RFID tag to enter the standby state from the selected one of the open state and the secured state.

11. The RFID system as claimed in claim 7, wherein the RFID system is RFID C1G2 compliant.

* * * * *